(12) United States Patent
Fischer et al.

(10) Patent No.: US 11,485,337 B2
(45) Date of Patent: Nov. 1, 2022

(54) SUPPORT OF TRAIN CONTROL SYSTEMS BY ONLINE TRANSMISSION OF INFORMATION ABOUT BRAKING ABILITY

(71) Applicant: KNORR-BREMSE SYSTEME FÜR SCHIENENFAHRZEUGE GMBH, Munich (DE)

(72) Inventors: Marcus Fischer, Munich (DE); Jörg-Johannes Wach, Munich (DE); Marc-Oliver Herden, Munich (DE); Peter Berger, Unterschleissheim (DE); Rainer Rau, Geretsried (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 158 days.

(21) Appl. No.: 16/603,532

(22) PCT Filed: Apr. 9, 2018

(86) PCT No.: PCT/EP2018/058978
§ 371 (c)(1),
(2) Date: Oct. 7, 2019

(87) PCT Pub. No.: WO2018/189078
PCT Pub. Date: Oct. 18, 2018

(65) Prior Publication Data
US 2021/0086739 A1      Mar. 25, 2021

(30) Foreign Application Priority Data
Apr. 11, 2017 (DE) .................... 10 2017 206 199.5

(51) Int. Cl.
| | | |
|---|---|---|
| *B60T 13/66* | (2006.01) | |
| *B61H 7/00* | (2006.01) | |
| *B61L 15/00* | (2006.01) | |

(52) U.S. Cl.
CPC .............. *B60T 13/665* (2013.01); *B61H 7/00* (2013.01); *B61L 15/0018* (2013.01)

(58) Field of Classification Search
CPC ............. B61L 27/0088; B61L 27/0094; B61L 23/044; B61L 23/34; B61L 15/0081;
(Continued)

(56) References Cited

U.S. PATENT DOCUMENTS 3,365,572 A * 1/1968 Strauss ................... B61L 23/34
246/29 R
6,459,980 B1 * 10/2002 Tabata ................... B60L 50/61
180/65.245
(Continued)

FOREIGN PATENT DOCUMENTS

DE   102004048993 A1   4/2006
DE   102005034056 A1   2/2007
(Continued)

OTHER PUBLICATIONS

European Office Action corresponding to 17 170 030.5, dated Feb. 22, 2019.

*Primary Examiner* — Robert A. Siconolfi
*Assistant Examiner* — San M Aung
(74) *Attorney, Agent, or Firm* — Barnes & Thornburg LLP

(57) ABSTRACT

A method and a control device determine a position-related braking ability of a vehicle. A first vehicle determines at least one piece of position-related information of a route section, the at least one piece of position-related information of the route section being information relating to the braking ability on the route section. The first vehicle transmits the at least one piece of position-related information to a receiver, the receiver being at least one second vehicle, whereby the braking curves of at least one rail vehicle are adapted (Continued)

according to the situation, thus allowing safety on the route section and the utilization of the section to be improved.

21 Claims, 6 Drawing Sheets

(58) Field of Classification Search
CPC ........ B61L 3/006; B61L 3/008; B61L 25/025; B61K 9/10; B60L 3/0015; B60L 3/00; B60L 15/2009; B60L 15/0018; B60L 2240/70; B60L 2240/665; B60L 2240/667; B60L 2240/662; B60L 2200/26; B60T 13/665; B60T 17/228; B61H 7/00; Y02T 10/72; Y02T 10/64
USPC .......................................................... 303/16
See application file for complete search history.

(56) References Cited

U.S. PATENT DOCUMENTS

| | | | |
|---|---|---|---|
| 10,062,281 B1* | 8/2018 | Brookins | G08G 1/0141 |
| 2003/0139882 A1* | 7/2003 | Miller | G08G 1/163 |
| | | | 701/45 |
| 2004/0245410 A1* | 12/2004 | Kisak | B61L 27/20 |
| | | | 246/3 |
| 2011/0025267 A1* | 2/2011 | Kamen | H02J 7/0027 |
| | | | 320/109 |
| 2013/0310067 A1* | 11/2013 | Nakata | G01S 13/931 |
| | | | 455/456.1 |
| 2016/0159381 A1* | 6/2016 | Fahmy | B61K 9/10 |
| | | | 701/19 |
| 2018/0105192 A1* | 4/2018 | Rahn | B61L 15/0081 |
| 2018/0162427 A1* | 6/2018 | Driemel | B61L 1/161 |

FOREIGN PATENT DOCUMENTS

| | | |
|---|---|---|
| DE | 102011075218 A1 | 11/2012 |
| DE | 102011075991 A1 | 11/2012 |
| DE | 102012214912 A1 | 2/2014 |
| DE | 102014107225 A1 | 11/2015 |
| EP | 1746000 A2 | 1/2007 |
| EP | 31457464 A1 | 3/2017 |
| EP | 3168111 A1 | 5/2017 |

* cited by examiner

SUPPORT OF TRAIN CONTROL SYSTEMS BY ONLINE TRANSMISSION OF INFORMATION ABOUT BRAKING ABILITY

CROSS REFERENCE AND PRIORITY CLAIM

This patent application is a U.S. National Phase of International Patent Application No. PCT/EP2018/058978 filed Apr. 9, 2018, which claims priority to Germen Patent Application No. German 10 2017 206 199.5 filed Apr. 11, 2017, the disclosures of which are incorporated herein by reference in their entirety.

FIELD

Disclosed embodiments relate to a method for taking into consideration at least one piece of position-dependent information pertaining to the braking capability on a line section for the operation of vehicles, in particular rail vehicles.

SUMMARY

Disclosed embodiments provide a method and an apparatus for performing a method that is able to reliably ascertain information concerning the braking capability on a line section and to use this information to plan the further operational flow and in particular to pass it on to other rail vehicles.

BRIEF DESCRIPTION OF FIGURES

Disclosed embodiments are described below with reference to the accompanying drawings, in which, in detail.

DETAILED DESCRIPTION

Figure 1:
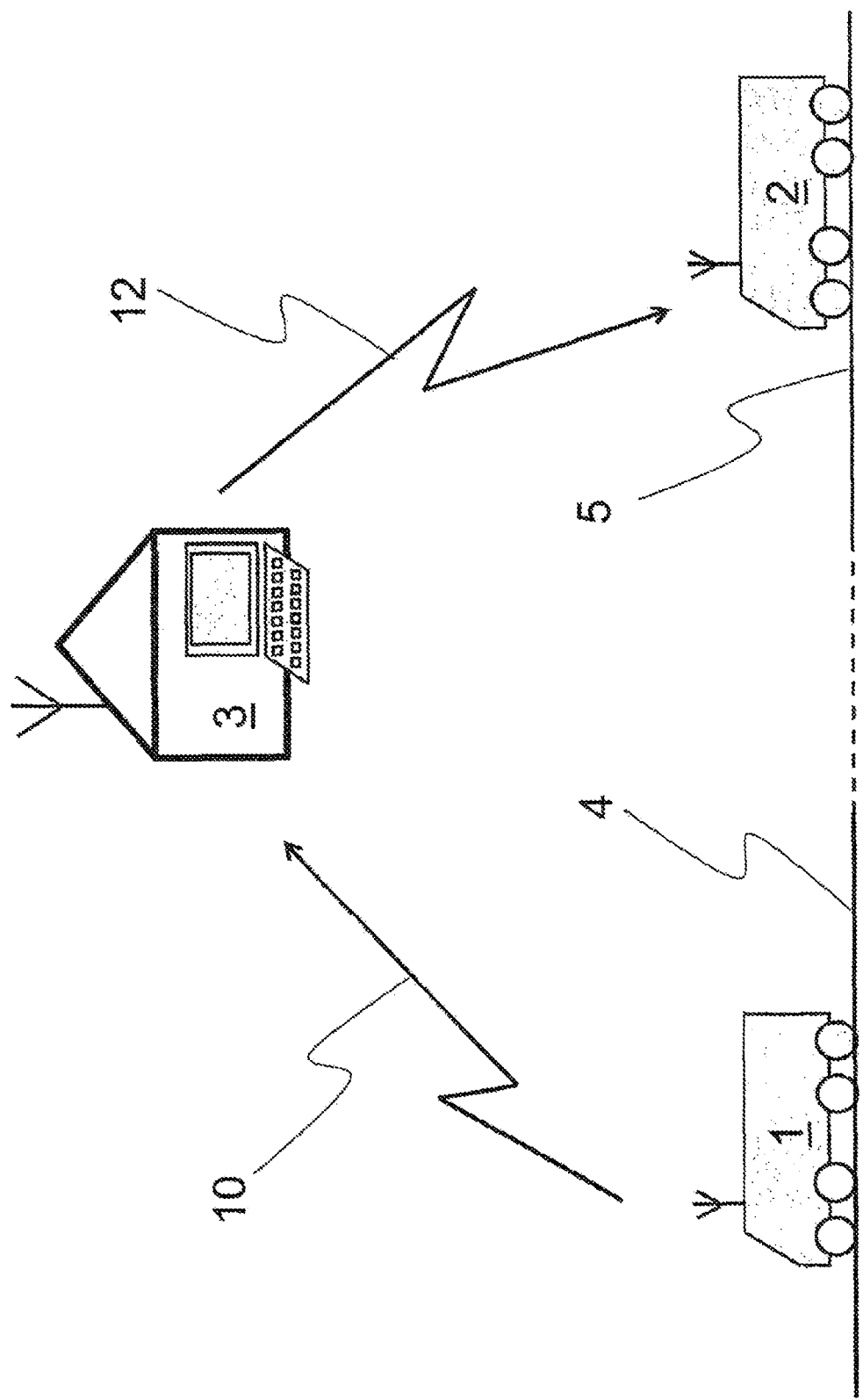
FIG. 1 shows an embodiment in which the communication takes place via a wayside device.

When operating rail vehicles, braking capability, which is understood to mean both the ability of a rail vehicle to achieve a desired deceleration to a standstill under the influence of the environment and an associated possibility of using different braking systems of the rail vehicle, plays a central part. Several aspects must be considered in this case.

From safety perspectives, knowledge of the braking capability on a line section is indispensable in order to safely bring a rail vehicle to a standstill at a prescribed stopping point. A stopping point in this context can be an envisaged, that is to say scheduled, stopping point, such as for example a station or a stop signal, but stopping points can likewise be understood to mean unscheduled or unenvisaged positions. These can involve possible obstacles or objects on the line, where running through these stopping points can possibly result in a collision with the object and in the worst case in injury to persons.

For this reason, information pertaining to the braking capability on individual line sections is today cataloged for running and therefore kept as static or quasistatic information, according to which an applicable line section is used on the basis of this information. In this context, quasistatic information must be understood to mean information that changes only comparatively slowly, such as e.g. works positions, tree population or associated leaf fall. However, this information often does not reflect conditions actually prevailing on the line.

If, after having gone through a signal, for example, a driver of a rail vehicle establishes that the braking capability on this section that he was just on is reduced, then he can pass this on to the control center, which transmits this information to subsequent rail vehicles. From time to time, there is also an obligation to report such events in order to record sections having decreased braking capability. When these events amass in a line section, for example the control center temporarily places a restriction on the maximum permissible velocity.

In order to overcome the problems of reduced braking capability, seasonal timetables for rail vehicles are also issued, with a winter timetable normally taking into consideration a poorer braking capability and hence the journey times allowing for decreased maximum velocities, for example.

In order to reliably determine braking capability time after time, measurement journeys would need to be made on a current basis examining critical line sections for their braking capability time after time. These measurement journeys represent an enormous cost factor, however, and are therefore made only in exceptional cases.

Instead, a possibly decreased braking capability is taken into consideration by virtue of rail vehicles not traveling at the minimum required distance from one another in order still to be able to come to a standstill without collision when the vehicle in front brakes, but rather safety elements are additionally included in the distance between the rail vehicles as well, resulting in greater spacings.

However, this approach leads to the available line capacity not being fully exhausted, which results in a financial disadvantage for the rail network operator.

Disclosed embodiments are based on the object of providing a method and an apparatus for performing this method that is able to reliably ascertain information concerning the braking capability on a line section and to use this information to plan the further operational flow and in particular to pass it on to other rail vehicles.

Disclosed embodiments provide a method that optionally collects position-related information concerning the braking capability on a line section and processes the information further in order to further influence a vehicle.

Optionally, this information is added to by the ascertainment of further information.

Optionally, the vehicle has open-loop or closed-loop controlled systems that assist the driver or even undertake operation of the vehicle completely. This can involve assistance for the driver through to autonomous running mode.

Optionally, the position linked to the information about the braking capability at this position is ascertained by means of apparatuses and systems available in the vehicle.

By way of example, vehicles today usually have GPS receivers installed that allow position determination for the vehicle. This position information can subsequently be processed further by the method.

Optionally, influencing the vehicle involves at least one operating parameter of the vehicle being changed on the basis of the ascertained information pertaining to the braking capability or further information.

Optionally, the vehicle transmits the ascertained information pertaining to the braking capability or further information to a receiver.

Optionally, the vehicle moreover obtains position-related information concerning the braking capability on the line or further information from a transmitter.

Optionally, the position-related information about the braking capability on the line is transmitted wirelessly or on a cable basis, with established communication systems being able to be resorted to, such as for example are provided for in the standards of the European Train Control System (ETCS) or other train control systems.

In another advantageous embodiment, the transmission may be implemented using communication apparatuses provided and configured specifically for that purpose.

Optionally, the transmitters and receivers are further vehicles or wayside devices.

Optionally, the vehicles are embodied as rail vehicles traveling on a line that is monitored by wayside devices.

Optionally, wayside devices must be understood to mean control stations, signal boxes, signals or the like that have a direct or indirect influence on the running of the rail vehicles.

Optionally, the first rail vehicle ascertains position-related information pertaining to the braking capability on the present line section, wherein the braking capability must be understood to mean the ability to make a required deceleration available. This ability is among other things dependent on the adhesion of the line section and the possibility of using different braking systems of the rail vehicle (e.g. a conventional friction brake, a magnetic rail brake or an eddy current brake).

Adhesion, specifically characterized by the coefficient of adhesion, describes the adhesion of the wheel on the rail and therefore represents the physical limit for transferring the braking force to the rail. Adhesion is dependent on various factors, such as for example:
  temperature
  moisture on the rail
  soiling of the rail
  pairing of materials
  wheel contact force Moreover, a rail vehicle driven over the applicable line section changes the coefficient of adhesion by, for example as a result of a braking process or through the use of e.g. a magnetic rail brake, taking an existing film of moisture from the rail or changing or eliminating a soiling of the rail, as a result of which the rail is e.g. dried and the coefficient of adhesion improves.

In addition, the operation of rail vehicles also changes further states of the rail. As such, when the eddy current brake is used, the rail heats up as a result of the eddy currents produced, for example, such that a subsequent train optionally also takes into consideration the heating when deciding which braking system will be used for braking, in order to decrease the thermal load on the rail.

Optionally, a second rail vehicle takes into consideration this information when selecting the braking system that will be used for decelerating the rail vehicle.

In a further advantageous embodiment, the rail vehicle is capable of determining its own influencing of the braking capability on the line by its own operation on this line.

Optionally, the rail vehicle in this case ascertains a change in the adhesion on the basis of a braking operation performed by the rail vehicle, an acceleration or simple use of the line.

Optionally, the rail vehicle ascertains further state variables for the line that are suitable for determining the braking capability on the line. As such, for example heating of the rail as a result of a use of the eddy current brake or of a conventional brake is determined by the method.

Optionally, the rail vehicle determines the information concerning the braking capability on the line by using the sensors and/or apparatuses and/or methods available on the rail vehicle. As such, the coefficient of adhesion can be inferred by evaluating the wheel slippage for a braking operation, for example, the wheel slippage being able to be ascertained by means of wheel speed sensors individual to the vehicle.

Optionally, it is furthermore possible for heating of the rail to be effected by ascertaining the braking power, be it from a magnetic rail brake, an eddy current brake or a conventional brake or the like, or else by means of consideration of wheel slippage.

Optionally, the rail vehicle ascertains drying or a change in the properties of the line as a result of its own use, so that a new adhesion or dampness state behind the train can be inferred.

Optionally, these ascertainment operations have further information added to them, in particular about the ambient temperature, the weather conditions, the dampness of the line and the like, which allows more accurate determination of the braking capability on the line. In this case, this information is acquired via different sources. Optionally, the data are captured by the rail vehicles on the line or by the wayside devices or are added to by means of further sources, such as weather stations.

In a further advantageous embodiment, the rail vehicle uses additional sensors to determine the braking capability on the line, the additional sensors being installed on the rail vehicle for this purpose.

Optionally, these additional sensors are able to determine the braking capability on the line continuously, that is to say even on journeys with little deceleration or acceleration through to journeys at constant velocity, which provides in particular a continuous profile of the braking capability on a line.

Optionally, information concerning objects against or on the line that represent a danger to running is also transmitted. This information can be followed according to the disclosed embodiments by the operating parameters of the rail vehicle being changed.

Optionally, the information pertaining to the braking capability on the line has further information added to it, such as for example the likelihoods of change of the previously ascertained information. To this end, for example computing models are conceivable that ascertain the cooling behavior of the rail, after having been heated up by an eddy current brake, by taking into consideration the ambient temperature, or the drying of a layer of moisture on the rail, over time. In addition, it is conceivable for the information pertaining to the braking capability on the line to have information pertaining to the soiling of the rail added to it.

Optionally, further rail vehicles transmit information about on-vehicle braking systems or the operating and wear states thereof or the possibility of use thereof. This information is required for easier individualization of the braking capability of a rail vehicle on a line, as a result of which it is possible for individual operating parameters or running recommendations to be determined for each rail vehicle.

Optionally, the position-related information made available by the rail vehicles and further sources is taken as a basis for ascertaining optimum distances of the rail vehicles from one another, so that, according to the situation, a minimum required distance of the vehicles from one another is obtained, which ensures that the vehicles can be stopped at any time without the risk of a collision.

Optionally, the distances between the rail vehicles are ascertained such that a maximum utilization level of the line is obtained, which achieves a financial advantage.

Optionally, the method ascertains at least one operating parameter of at least one rail vehicle by taking into consideration the previously ascertained information.

Optionally, the at least one operating parameter is a situation-dependent braking curve for each vehicle, which optionally represents a setpoint velocity characteristic that substantially prescribes the position-dependent maximum velocity of the rail vehicle and allows safe stopping at the stopping point.

In another advantageous embodiment, the method ascertains not situation-dependent braking curves but rather other information, such as for example a necessary braking power to allow safe stopping at stopping point.

Optionally, in a further embodiment, detection of a critical situation on the line, which arises for example as a result of an obstacle and reduced braking capability, results in actions being triggered in the rail vehicle in order to ensure safe stopping at any time. These actions can be for example automatic adjustment of the vehicle velocity or automatic braking intervention.

Optionally, in this case is an addition to or extension of automatic running mode.

The individual method operations may be, optionally, not necessarily performed only by one rail vehicle, or one wayside device. Rather, individual method operations may be distributed over various rail vehicles and wayside devices that interchange data with one another via suitable connections.

In one advantageous embodiment, the position-related information about the braking capability is ascertained by the rail vehicles that are on the line, the recorded information being combined in a wayside device monitoring the applicable line section and further actions and running recommendations being determined from the information. These actions and running recommendations are subsequently transmitted to following rail vehicles that use the applicable line section on these assumptions.

In one advantageous embodiment, adhesion that is detected as too poor on a line section results in a trigger action taking place to improve the adhesion on this line section. This can be a status report on a wayside device, associated with the line section, that coordinates the improvement of the adhesion on the basis of this trigger action. By way of example, the adhesion is subsequently improved again by maintenance actions such as grinding of the rail or cleaning actions, for example by a vehicle that is available specifically for this purpose. Moreover, it is also conceivable to thereby request further maintenance actions such as for example pruning.

In a further advantageous embodiment, disclosed embodiments exist as a computer program product having program code, stored on a machine-readable carrier, for performing the method, this providing the opportunity to transfer the disclosed embodiments to new or existing rail vehicles and/or wayside devices.

In a further advantageous embodiment, a control apparatus is installed in at least one rail vehicle and performs the method described above.

In a further advantageous embodiment, a control apparatus is installed in at least one wayside device and performs the method described above.

In a further advantageous embodiment, a multipartite control apparatus is provided, wherein at least one part is provided in at least one rail vehicle and at least one further part is provided in at least one wayside device, all parts in combination performing the method described above.

Optionally, the control apparatus, regardless of whether it is of integral or multipartite design, has at least one interface to a user.

This interface is optionally in the form of a handheld device suitable for being carried by the user.

In another advantageous embodiment, the interface is installed in stationary fashion in at least one rail vehicle and/or at least one wayside device.

Using this interface, a user is optionally able to make information pertaining to the braking capability on the line available for further processing himself and/or to prompt trigger actions himself.

Disclosed embodiments are optionally combinable in any embodiment with other methods or apparatuses for controlling a rail vehicle and optionally has appropriate interfaces to be able to exchange signals or information with other methods or apparatuses.

Optionally, disclosed embodiments are incorporated in a grouping for vehicle control in which the responses of all of the subsystems or parts thereof are processed. FIG. 1 shows an embodiment in which the communication is ensured via a wayside device 3.

On a line section 4 there is a first rail vehicle 1, which is connected to a wayside device 3 via a data connection 10. In this case, the wayside device 3 can be a rail service control station, a signal box or another wayside apparatus.

The first rail vehicle 1 is followed on the same line by a second rail vehicle 2 on a line section 5. This second rail vehicle 2 is connected to the wayside device 3 via a data connection 12.

Using the data connection 10, the first rail vehicle 1 transmits position-related information concerning the line section 4 to the wayside device 3. This is primarily information concerning the braking capability that there is on the line section 4, which information is ascertained by the first rail vehicle 1.

Information characterizing the braking capability is among other things information pertaining to the adhesion or information pertaining to the condition of the rail, such as for example rail temperature. In this context, rail temperature is the bounding parameter for use of the eddy current brake, since the rail heats up as a result of the use of the eddy current brake, and excessive heating of the rail is optionally supposed to be prevented.

According to disclosed embodiments, the first rail vehicle 1 ascertains this position-related information continuously if possible, or during specific operational events, such as for example braking or acceleration.

This information is processed further in the wayside device 3 and transmitted to the second rail vehicle 2 via a data connection 12. Moreover, the wayside device 3 is able to generate and transmit to the second rail vehicle 2 running recommendations, or setpoint value stipulations, from the information of the first rail vehicle 1.

The second rail vehicle 2 therefore uses the ascertained data of the first rail vehicle 1 and is consequently able to plan use of the line section 4 or to use the line section 4 in accordance with the planning of the wayside device 3.

Figure 2:
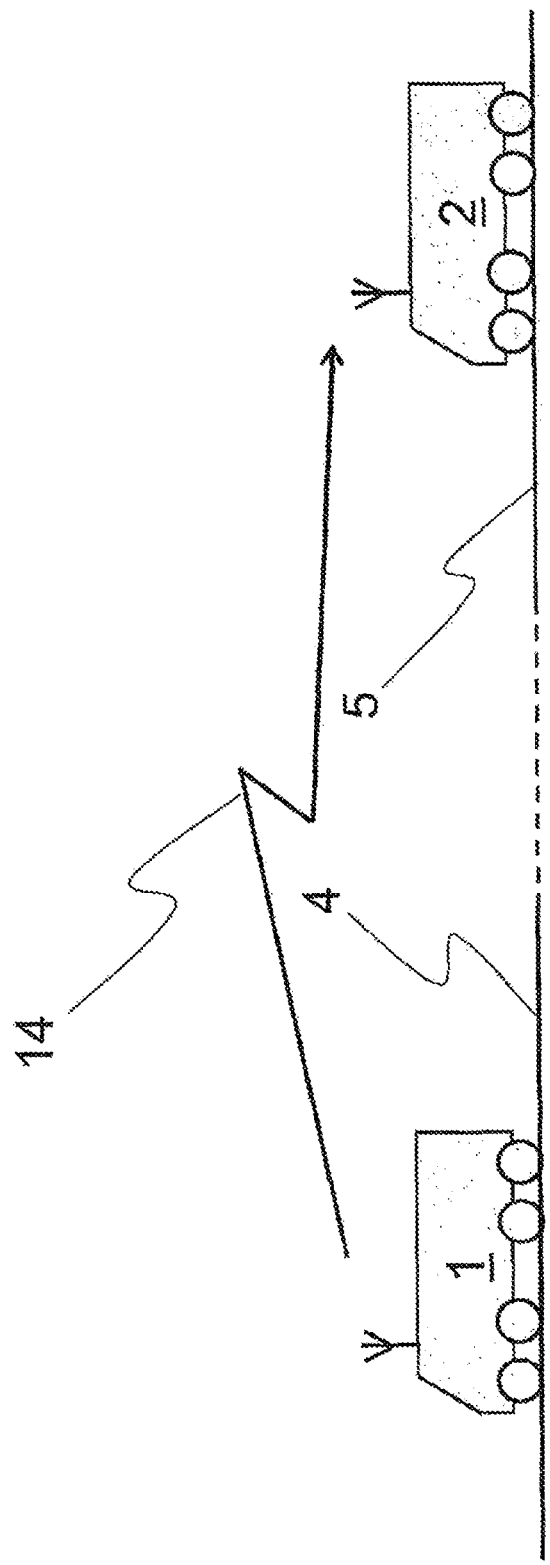
FIG. 2 shows an embodiment in which the communication takes place directly between two rail vehicles.

FIG. 2 shows an embodiment in which the communication takes place directly between two rail vehicles. This embodiment corresponds substantially to that from FIG. 1, but the communication of the first rail vehicle 1 takes place directly with the second rail vehicle 2 via a data connection 14 and not indirectly via an interposed wayside device 3. In both exemplary embodiments described, the first rail vehicle 1 acts as the measuring vehicle, which supplies the second rail vehicle 2 with information about the line section 4 ahead of it.

Besides that, the first rail vehicle 1 is able to ascertain how the position-related information about the line section 4 changes as a result of the use of the first rail vehicle 1.

By way of example, the use of the magnetic rail brake of the first rail vehicle 1 changes the coefficient of adhesion of the line section 4 by virtue of moisture or soiling that are on the rail being changed or eliminated by the magnetic rail brake. As a result, an increase in the coefficient of adhesion of the line section 4 can be achieved. This information is made directly accessible to the second rail vehicle 2, as a result of which the latter can plan use of the line section 4.

By way of example, the second rail vehicle 2 now uses the line section 4 at a decreased maximum velocity when the coefficient of adhesion has been reported to be decreased, since the braking capability on this line section 4 has worsened and hence a decreased maximum velocity allows safe stopping, e.g. at a station.

Figure 3:
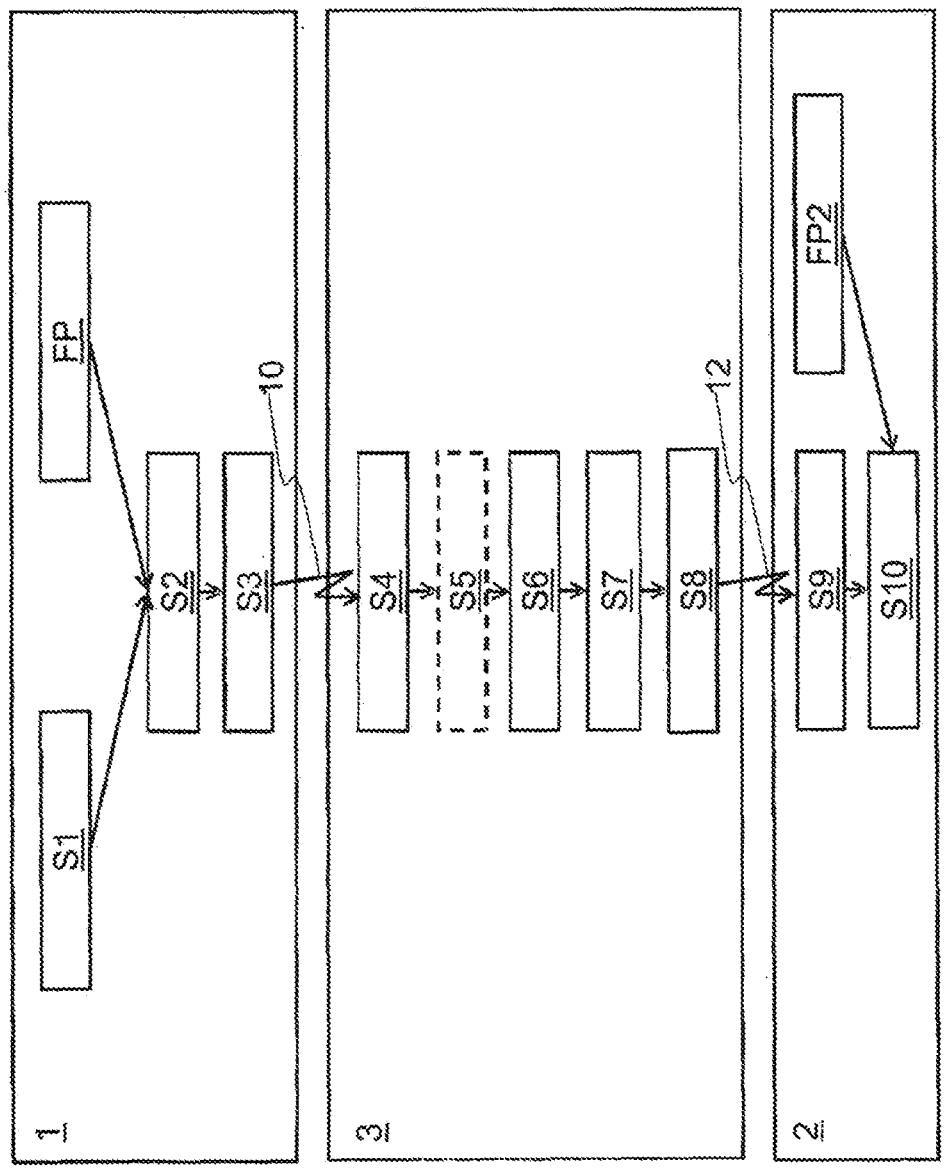
FIG. 3 shows a flowchart for the method according to the disclosed embodiment from FIG. 1.

FIG. 3 shows a flowchart for the method according to the disclosed embodiments in accordance with the situation shown in FIG. 1.

In this case, the first rail vehicle 1 performs the following operations of the method:

Capturing measurement data S1: While running, the first rail vehicle 1 continually measures line parameters, such as for example rail temperature, ambient temperature, dampness, wheel slippage during braking or acceleration and/or other running states.

Ascertaining the present braking capability S2: From the information from S1 and additional vehicle parameters FP of the first rail vehicle 1, such as for example the available braking power or the state of the braking system, for example the state of wear of the brake linings, or applied braking pressures or braking torques, the present braking capability on the line section 4 that the first rail vehicle 1 is on is ascertained at this juncture.

Sending the information S3: The information generated in S2 is transmitted to a wayside device 3 by means of the data connection 10 in operation S3. The data connection 10 may in this case be in the form of a radio connection or in another suitable form, for example by utilizing available infrastructure, such as the different ETCS systems described previously. Additionally, the vehicle parameters FP can be transmitted, which can be used to generate further running recommendations.

The further processing of the information concerning the braking capability on the line section 4 now takes place in the wayside device 3:

Receiving the information S4: The wayside device 3 uses the data connection 10 to perform reception S4 of the information of the first rail vehicle 1 and conditions the information at the input for the purpose of further processing.

Plausibility checking S5: If need be, the information is subsequently checked for plausibility S5, with implausible or unrealistic information being erased and not processed further.

Storing S6: The information is subsequently stored S6 in a database containing standard values pertaining to the use of the line section 4. These standard values may be for example information about the coefficient of adhesion, or the permissible maximum velocity. According to disclosed embodiments, this information is transmitted to the further rail vehicles instead of the standard values. Should information about the line section 4 not be up to date or be missing, then the method resorts to the standard values of the database.

Defining running recommendations S7: In a further method operation S7, running recommendations pertaining to the use of the line section 4 are ascertained. In this case, running recommendations must be understood to mean in particular maximum permissible velocities, possible stopping distances and the like. At the same time, the minimum distances between the individual rail vehicles that are on the line are also planned in this operation. This allows more efficient utilization of the line capacity by virtue of the densest possible succession of rail vehicles being ensured on the line, the rail vehicles merely keeping the minimum required safety distance, which is obtained from the previously ascertained position-related information.

In an embodiment that is not depicted, the minimum distances and further running recommendations are planned by taking into consideration the individual vehicle parameters of the subsequent vehicles, this information being able to be available statically, or being able to be produced dynamically during operation. As such, planning of the minimum distances and further running recommendations can involve the state of wear of the braking system or the vehicle weight being examined, for example.

Sending the information S8: In a further operation S8, the information thus generated is sent from the wayside device 3 to the second rail vehicle 2 via the data connection 12. The data connection 12 may in this case be in the form of a radio connection or in another suitable form, for example by utilizing available infrastructure, such as the different ETCS systems described previously.

The further processing of the information concerning the braking capability of the line section 4 now takes place in the second rail vehicle 2:

Receiving the information S9: The second rail vehicle 2 receives the information of the wayside device 3 and conditions it for further processing in the second rail vehicle 2.

Triggering actions S10: The information received and conditioned in operation S9 and the vehicle parameters FP2 of the second rail vehicle 2, such as for example the state of wear of its own braking system, are taken as a basis for triggering actions in the second rail vehicle 2, such as for example adjusting the velocity to the now permissible maximum velocity, or setting the appropriate distance from the first rail vehicle 1 traveling ahead, the actions being performed by the second rail vehicle 2 independently, in particular in automated running mode. If the second rail vehicle 2 is not in automated running mode, or if the mode is not present or not available, then information about the line section 4 ahead can also be transmitted to the driver, whereupon he takes appropriate measures.

Figure 4:
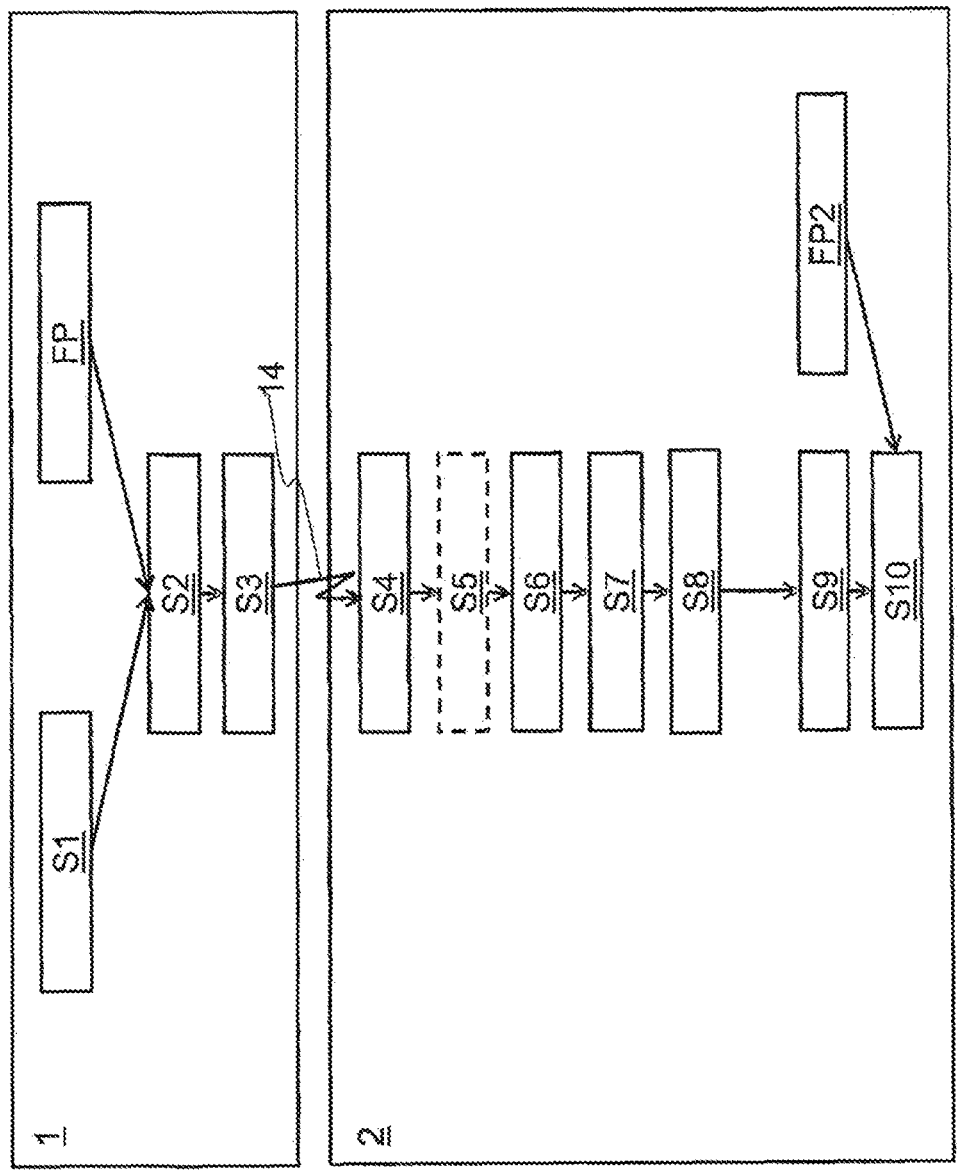
FIG. 4 shows a flowchart for the method according to the disclosed embodiment from FIG. 2.

FIG. 4 shows a flowchart for the method according to the disclosed embodiments in accordance with a situation as shown in FIG. 2.

The sequence of operations S1 to S10 corresponds in this case to the sequence of the method from FIG. 3, but the operations of the wayside device 3 are now performed by the second rail vehicle 2.

The first rail vehicle 1 uses the data connection 14 to transmit the information directly to the second rail vehicle 2. The data connection 14 may in this case be in the form of a radio connection or in another suitable form, for example by utilizing available infrastructure, such as the different ETCS systems described previously.

Further embodiments, as shown in FIG. 3 and FIG. 4, can be formed by shifting the boundaries of the first and second rail vehicles 1, 2 and the wayside device 3 and adding or removing further method operations.

Figure 5:
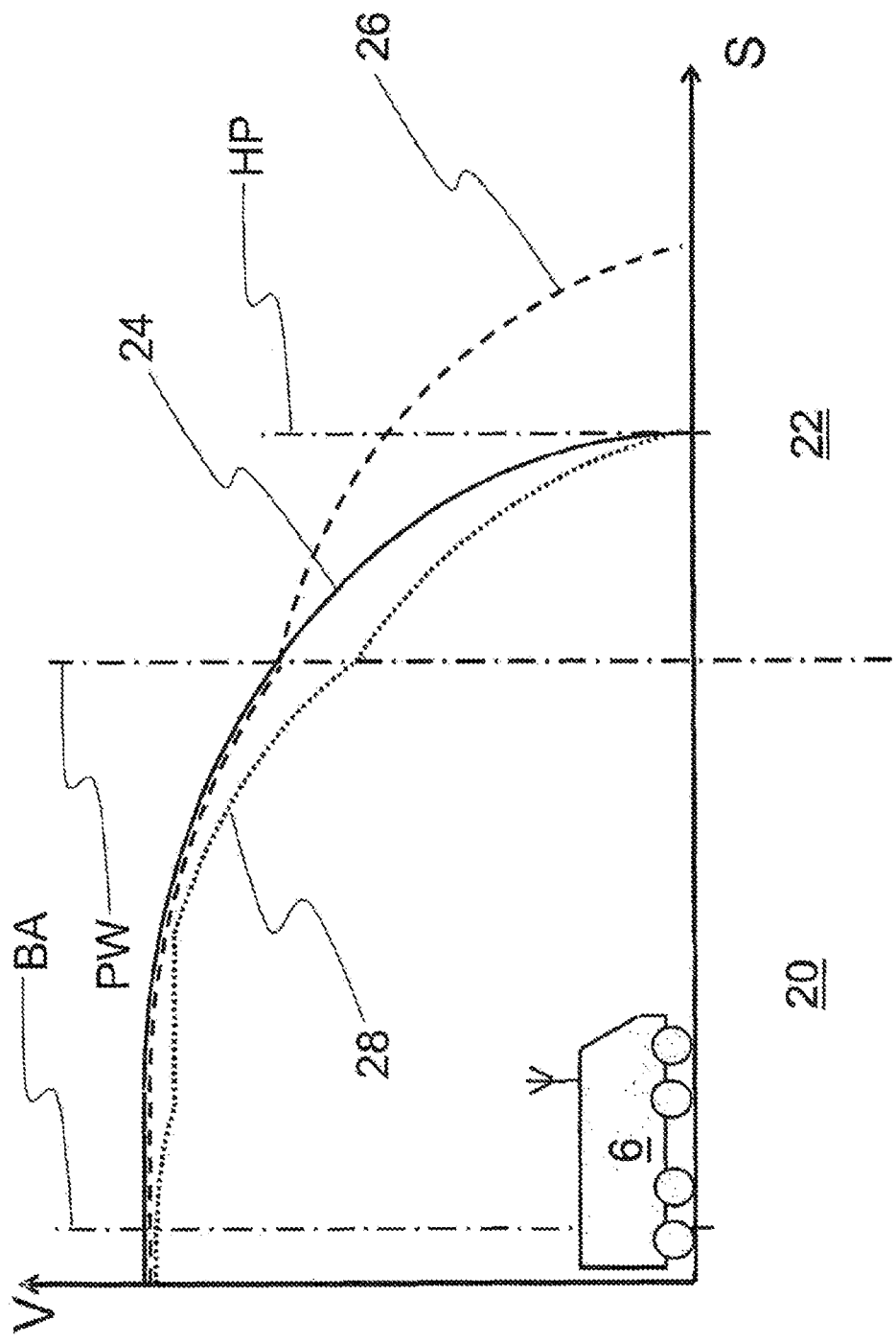
FIG. 5 shows a characteristic of a braking curve influenced by the method according to the disclosed embodiments in comparison with a braking curve in accordance with the prior art.

FIG. 5 shows a characteristic of a braking curve influenced by the method according to a disclosed embodiment in comparison with a braking curve in accordance with the prior art.

A rail vehicle 6 moves along the path S at the velocity V. In section 20, there is normal braking capability in this case, with a section 22 with reduced braking capability following on from the point of the parameter change PW. In section 22, there is a stopping point HP at which the rail vehicle 6 is supposed to be brought to a standstill. The stopping point in this case can be a signal, a railway station or a randomly chosen stopping point on the line.

A setpoint braking curve 24 is depicted that represents the deceleration characteristic of the rail vehicle 6 in the case of normal braking capability. Should no worsening of the braking capability or else of the braking power arise, the actual braking curve would follow the setpoint braking curve 24, and a rail vehicle 6 would be brought to a standstill at the stopping point HP.

The actual braking curve 26 now shows the stopping process of the rail vehicle 6 in accordance with the prior art. To begin with, the actual braking curve 26 and the setpoint braking curve 24 are identical in section 20 in this case, since the deceleration in section 20 takes place under ideal conditions, that is to say conditions under which the setpoint braking curve 24 has been ascertained.

At the transition from section 20 to section 22, that is to say the parameter change PW, the braking capability on the line now changes. The result of this is that the wheel/rail contact now means that less braking force can be transferred, as a result of which the deceleration of the rail vehicle 6 ends up being less. Consequently, the rail vehicle 6 can no longer keep to the required setpoint braking curve 24. The actual braking curve 26 is therefore above the setpoint braking curve 24 from the parameter change PW onward.

Since the reduced braking capability over section 22 means that there is also no longer the possibility of an increase in braking force, the rail vehicle 6 runs through the stopping point HP and does not come to a standstill until afterwards.

According to the disclosed embodiments, the braking curve of the rail vehicle 6 is now adjusted on the basis of the situation in order to ensure safe stopping at the stopping point HP.

To begin with, the rail vehicle 6 moves in section 20 with normal braking capability in accordance with the setpoint braking curve 24. According to the disclosed embodiments, the rail vehicle 6 is provided with the information that the braking capability decreases on the subsequent section 22.

The rail vehicle 6 then performs a brake curve adjustment BA, which results in the situation-dependent actual braking curve 28. A new setpoint braking curve has not been depicted, since it would be identical to the actual braking curve 28. The rail vehicle 6 then travels along the section 20 at reduced velocity, in comparison with the previous setpoint braking curve 24, and performs the braking operation already knowing the change in braking capability.

The result of this is that the now initiated deceleration already takes place with knowledge of the reduced braking capability on section 22. The braking operation is carried out in this case with a higher level of deceleration, which means that the rail vehicle 6 enters section 22 at reduced velocity. The parameter change PW means that the present deceleration cannot be maintained, as a result of which the velocity reduction now takes place with a shallower gradient. As a result, a kink in the actual braking curve 28 at the point of the parameter change PW also appears at this juncture. However, the rail vehicle 6 comes to a standstill at the stopping point HP, since it enters section 22 at the requisite reduced velocity.

The method according to the disclosed embodiments in this case ensures that stopping at a stopping point HP is rendered possible by prescribing an appropriate situation-dependent braking curve 28. This allows a changing braking capability to be met by virtue of the rail vehicle 6 having a new braking curve 28 made available to it.

Figure 6:
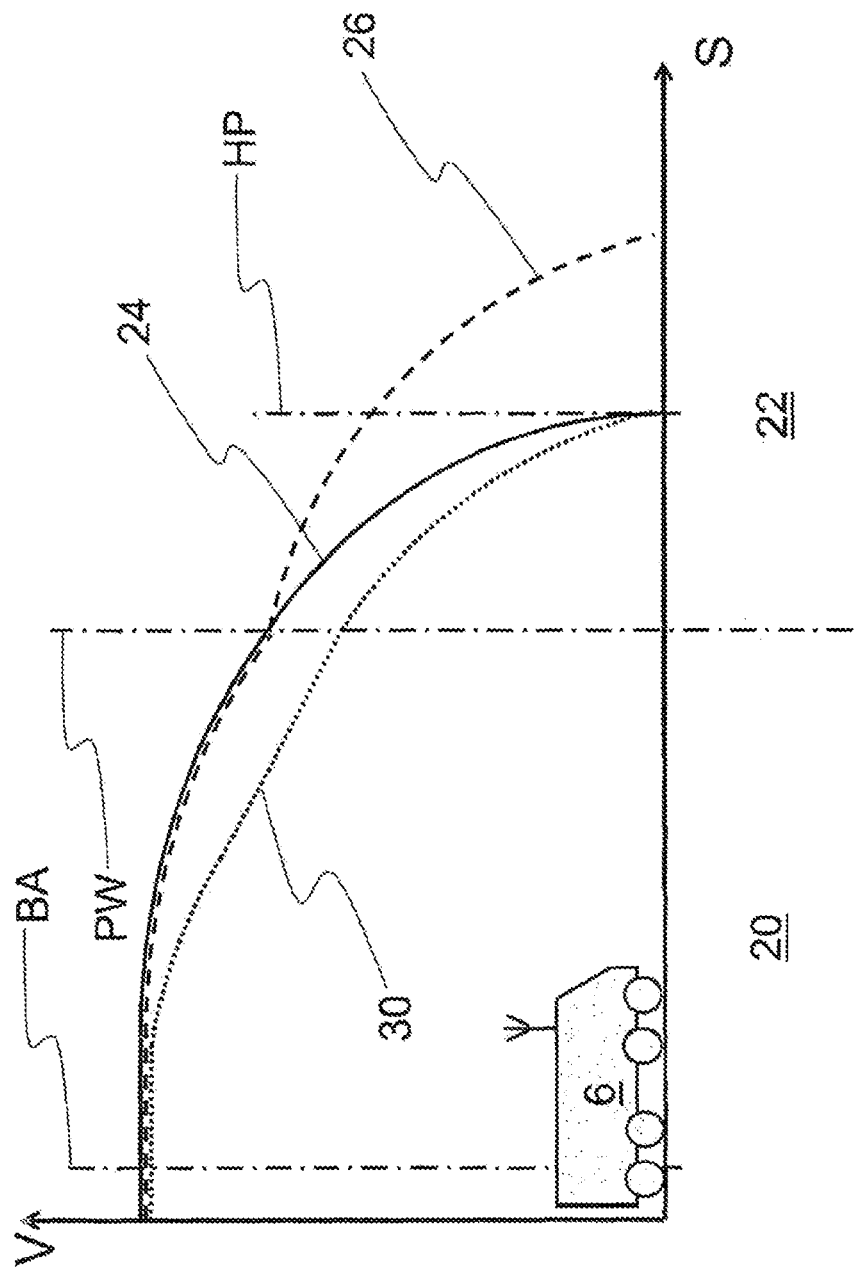
FIG. 6 shows a characteristic of a further braking curve influenced by the method according to the disclosed embodiments in comparison with the braking curve in accordance with the prior art.

FIG. 6 shows a characteristic of a further actual braking curve 30 in comparison with the braking curves in accordance with the prior art.

In contrast to the actual braking curve 28 in FIG. 5, in this case an actual braking curve 30 is chosen in section 20 that moreover has the aim of making entry into section 22 as comfortable as possible.

For this purpose, the velocities and the gradients thereof, that is to say their decelerations, are chosen such that the velocity and the deceleration immediately before and after the parameter change PW are the same.

The result of this is that no kink appears in the actual braking curve 30 at the point of the parameter change PW, but rather the rail vehicle 6 enters section 22 at/with the requisite reduced velocity and deceleration in order to come to a standstill exactly at the starting point HP in the course of the further braking.

The lack of a kink in the actual braking curve 30 protects in particular passengers who have already stood up before an approaching station, that is to say a stopping point HP, and, while standing, possibly with luggage in hand, are not well able to compensate for a change of deceleration, that is to say a kink in the velocity characteristic, and may possibly fall.

Disclosed embodiments are is not restricted to the embodiments described above; rather, further embodiments can be obtained by further combinations of the features described above.

LIST OF REFERENCE SIGNS

1 First rail vehicle
2 Second rail vehicle
3 Wayside device
4 Line section, first rail vehicle
5 Line section, second rail vehicle
6 Rail vehicle
10 Data connection, first rail vehicle-wayside device
12 Data connection, second rail vehicle-wayside device
14 Data connection, first rail vehicle-second rail vehicle 20 Area with normal braking capability
22 Area with reduced braking capability
24 Setpoint braking curve according to prior art
26 Actual braking curve according to prior art
28 Situation-dependent actual braking curve
30 Situation-dependent actual braking curve
BA Braking curve adjustment
FP Vehicle parameters, first rail vehicle
FP2 Vehicle parameters, second rail vehicle
HP Stopping point
PW Parameter change
S Path
S1 Capturing measurement data
S2 Ascertaining present braking capability
S3 Sending the information
S4 Receiving the information
S5 Plausibility checking
S6 Storing the information in a database
S7 Defining running recommendations
S8 Sending the information
S9 Obtaining the information
S10 Triggering actions
V Velocity

The invention claimed is:

1. A method for ascertaining a position-related braking capability of a first vehicle for at least one second vehicle, the method comprising:
ascertaining, by the first vehicle, at least one piece of position-related information about a line pertaining to a braking capability on the line, wherein the braking capability is the ability to make a required deceleration available;
transmitting, by the first vehicle, the at least one piece of position-related information about the line to a receiver, wherein the receiver is the at least one second vehicle, and
taking the at least one ascertained piece of information and/or an obtained piece of information is taken as a basis for triggering at least one action in at least the first rail vehicle and/or the second rail vehicle and/or a wayside device,
wherein the at least one action is a determination of a situation-dependent braking curve for at least one rail vehicle.

2. The method of claim 1, further comprising receiving at least one further piece of position-related information by the first vehicle from a transmitter.

3. The method of claim 1, further comprising receiving the transmitted at least one piece of position-related information to a further receiver that is at least one further vehicle and/or at least one wayside device.

4. The method of claim 2, wherein the transmitter is at least one further vehicle and/or at least one wayside device.

5. The method of claim 1, wherein the first vehicle is a first rail vehicle and the at least second vehicle is a second rail vehicle.

6. The method of claim 1, wherein the at least one piece of information pertains to braking capability on the line during a deceleration process, and/or an acceleration process, and/or in another running situation.

7. The method of claim 6, wherein the information pertaining to the braking capability is at least one piece of position-related information about an adhesion between at least one wheel of the first rail vehicle and a rail.

8. The method of claim 1, further comprising the first rail vehicle and/or the second rail vehicle ascertaining at least one piece of position-related information pertaining to the possibility of using at least one braking system.

9. The method of claim 1, wherein the at least one piece of position-related information pertaining to the possibility of using at least one braking system is a temperature of a rail.

10. The method of claim 6, wherein the at least one piece of position-related information pertaining to the braking capability pertains to a present line section and involves influence of the first rail vehicle itself on the braking capability also being taken into consideration.

11. The method of claim 6, wherein the first rail vehicle ascertains the at least one piece of position-related information pertaining to the braking capability using sensors and/or apparatuses and/or methods available in the first rail vehicle.

12. The method of claim 11, wherein the first rail vehicle ascertains the at least one piece of position-related information pertaining to the braking capability using additional sensors and/or apparatuses and/or methods.

13. The method of claim 2, wherein the at least one further piece of position-related information is information
pertaining to an ambient temperature and/or
pertaining to a weather conditions and/or
pertaining to a dampness of the line and/or
pertaining to a rail temperature and/or
pertaining to the likelihood of change of the position-related information and/or
pertaining to objects against or on the line and/or
pertaining to a soiling of a rail, and/or
at least one further piece of information is information about the state of at least one braking system of the second vehicle.

14. The method of claim 1, wherein the at least one action is a decision about the selection of at least one braking system of the first rail vehicle or second rail vehicle for a line section.

15. The method of claim 1, wherein the at least one action is a determination of a necessary distance between at least the first rail vehicle and the second rail vehicle.

16. The method of claim 1, wherein the at least one action is a request for at least one maintenance action and/or for at least one cleaning action.

17. A computer program product having program code, stored on a non-transitory machine-readable carrier, for performing a method ascertaining a position-related braking capability of a first vehicle for at least one second vehicle, the method comprising:
ascertaining, by the first vehicle, at least one piece of position-related information about a line pertaining to a braking capability on the line, wherein the braking capability is the ability to make a required deceleration available;
transmitting, by the first vehicle, the at least one piece of position-related information to a receiver, wherein the receiver is the at least one second vehicle, and
taking the at least one ascertained piece of information and/or an obtained piece of information is taken as a basis for triggering at least one action in at least the first rail vehicle and/or the second rail vehicle and/or a wayside device,
wherein the at least one action is a determination of a situation-dependent braking curve for at least one rail vehicle.

18. A control apparatus for performing a method for ascertaining a position-related braking capability of a first vehicle for at least one second vehicle, the control apparatus being provided in at least one vehicle, the method comprising method comprising ascertaining, by the first vehicle, at least one piece of position-related information about a line-pertaining to a braking capability on the line, wherein the braking capability is the ability to make a required deceleration available; and transmitting, by the first vehicle, the at least one piece of position-related information to a receiver, wherein the receiver is the at least one second vehicle, wherein the control apparatus has interfaces for triggering at least one vehicle action, wherein the at least one vehicle action is a determination of a situation-dependent braking curve for at least one rail vehicle.

19. The control apparatus of claim 18, wherein the control apparatus is provided in a wayside device, and wherein the control apparatus has interfaces for triggering at least one action in the wayside device.

20. The control apparatus of claim 18, wherein the control apparatus is of multipartite design, wherein one part is provided in at least one vehicle, and/or a further part is provided in at least one wayside device, wherein the control apparatus has interfaces for triggering at least one action in the at least one vehicle or the at least one wayside device.

21. The control apparatus of claim 18, wherein the control apparatus has at least one interface to a user, wherein the interface is provided in the form of a portable handheld device and/or of a permanently installed input device in at least one vehicle or a wayside device.

* * * * *